Figure 2:
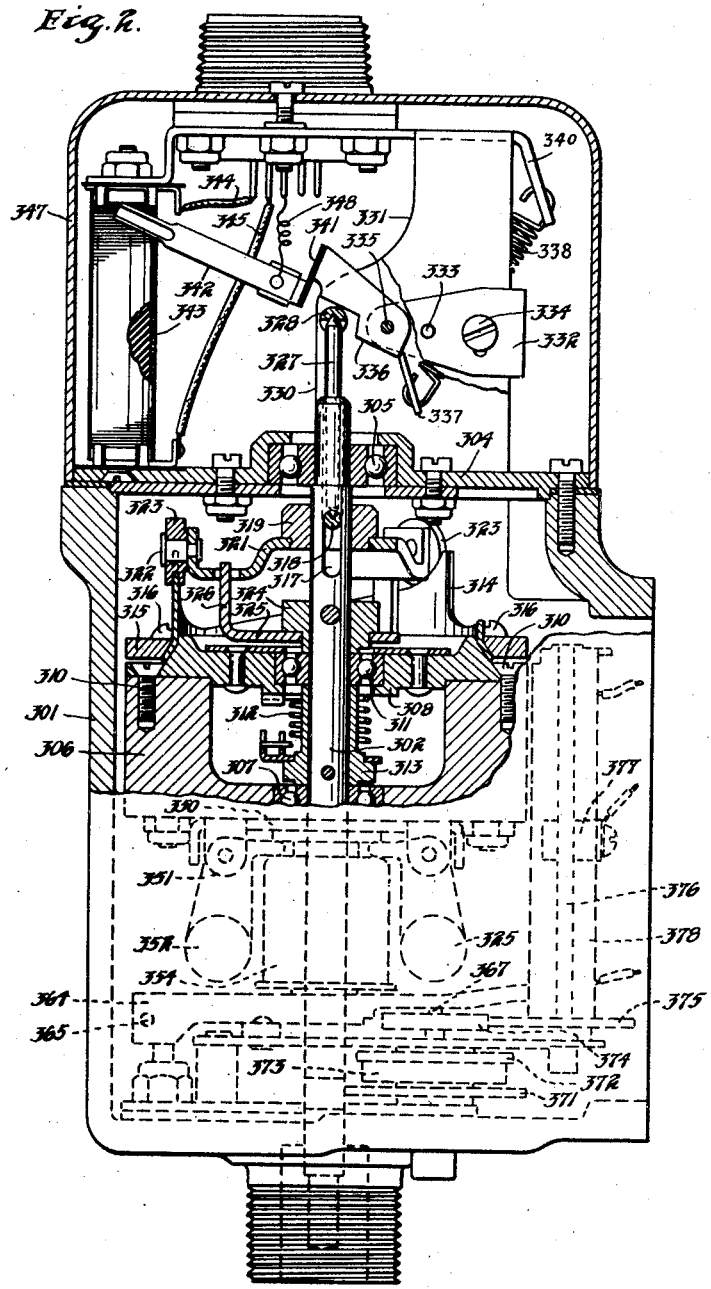

Sept. 9, 1947.                D. G. TAYLOR                2,427,239
                             CONTROL DEVICE
                         Filed Feb. 22, 1943        2 Sheets-Sheet 1

Fig. 1.

Inventor
DANIEL G. TAYLOR

By

George H. Fisher
       Attorney

Sept. 9, 1947.　　　D. G. TAYLOR　　　2,427,239
CONTROL DEVICE
Filed Feb. 22, 1943　　　2 Sheets-Sheet 2

Inventor
DANIEL G. TAYLOR

By
George H. Fisher
Attorney

Patented Sept. 9, 1947

2,427,239

UNITED STATES PATENT OFFICE 2,427,239

CONTROL DEVICE

Daniel G. Taylor, Minneapolis, Minn., assignor to Minneapolis-Honeywell Regulator Company, Minneapolis, Minn., a corporation of Delaware Application February 22, 1943, Serial No. 476,801

8 Claims. (Cl. 201—48)

1

The present invention relates to condition responsive measuring and/or control devices, and particularly to a device responsive to the acceleration of a rotating shaft.

In control devices responsive to the acceleration of a rotating shaft, it has been proposed to utilize a heavy mass rotatably mounted on the shaft and resiliently connected thereto by means of a spring. Such a mass rotates at the same angular velocity as the shaft, as long as the shaft is rotating at a constant angular velocity. Upon acceleration or deceleration of the shaft, the flexible connection between the mass and the shaft permits relative rotation of the mass and shaft, due to the inertia of the mass. This relative rotation of the mass and shaft has been utilized as a measure of the acceleration of the shaft.

It is therefore an object of my invention to provide an improved device for producing a control effect in accordance with the acceleration of a rotating shaft.

A further object of my invention is to provide an improved control device of the type shown and claimed in the co-pending application of Hubert T. Sparrow, Serial No. 476,797, filed February 22, 1943; and in the co-pending application of Albert E. Baak, Serial No. 476,799, filed February 23, 1943.

Another object of my invention is to provide a device responsive to the acceleration of a rotating shaft, in which relative angular movements of the shaft and a mass rotatably mounted thereon, are translated into movements of a control member in a direction axially of said shaft.

A further object of my invention is to provide a control device of the type described, in which a mass is threadedly mounted on a rotating shaft, so that upon relative angular movement of the shaft and mass, due to acceleration of the shaft, the mass also moves axially of the shaft, and means are provided for utilizing that axial movement to operate a control device.

A further object of my invention is to provide a device responsive to the acceleration of a rotating shaft, in which a mass driven by the shaft through a flexible connection operates a control member movable axially of the shaft through a cam and follower arrangement.

Other objects and advantages of my invention will become apparent from a consideration of the accompanying specification, claims, and drawing, in which:

Figure 1 represents a cross-sectional view of one form of control device embodying certain principles of my invention, and Figure 2 represents a cross-sectional view of a different form of control device embodying certain other principles of my invention.

Figure 1

There is shown in Figure 1 a control device enclosed in a cup-shaped housing 10, having a cover 11. A rotatable shaft 12 passes through an aperture in the cover 11. The shaft 12 is journaled in a bearing 13 carried by the cover 11 and in a bearing 14 carried by the casing 10.

A mass 15 of generally cylindrical form is threadedly carried on the shaft 12 within the housing 10. A torsion spring 16 has one end attached to the mass 15, as by a screw 17, and its other end engages a suitable aperture in a collar 18 fixed on the shaft 12 by a set screw 20. By loosening the set screw 20 and rotating the collar 18 on the shaft 20, the normal angular position of the mass 15 on the shaft 12 may be adjusted. Because of the threaded engagement between mass 15 and shaft 12, the longitudinal position of mass 15 along the shaft 12 is simultaneously adjusted.

A bracket 21 attached to the casing 10 pivotally supports a bell-crank lever having an arm 22 which projects downwardly into the path of longitudinal movement of the mass 15, and which carries at its extremity a roller 23 adapted to engage one surface of the mass 15.

The bell-crank lever pivotally mounted on bracket 21 has another arm 24, which extends in a direction substantially parallel to the shaft 12, and carries at its extremity a slider 25, which cooperates with an electrical resistance element 26. The arm 24 of the bell-crank lever has an upstanding ear 27. A tension spring 28 is connected between the ear 27 and the base of the bracket 21, and serves to bias the bell-crank lever for clockwise rotation about its pivotal support, thereby maintaining the roller 23 in engagement with the surface of mass 15.

The slider 25 is insulated from the arm 24 of the bell-crank lever by means of an insulating plate 30. An electrical conductor 31 is attached to the slider 25, by which it may be connected in an external circuit.

The resistance element 26 is wound on a form 32, of insulating material. The form 32 is generally arcuate in shape, to conform to the path of motion of the end of slider 25. One end of the form 32 is suitably attached to the casing 10, and the other end is supported by a bracket 33, which is in turn supported by the casing 10.

Operation of Figure 1

As long as shaft 12 is rotating at a constant angular velocity, its motion is transmitted through the spring 16 to the mass 15, which therefore rotates at the same angular velocity. The relative positions of the various parts are then the same as the positions shown in the drawing.

It is assumed that the shaft 12 is rotating in a clockwise direction, as viewed from the left-hand end of the shaft 12, as it appears in the drawing. If, after a condition of constant angular velocity of the parts has been established, the shaft 12 is suddenly accelerated, the mass 15, because of its inertia, does not immediately follow the motion of the shaft 12, but lags behind. The angle of lag is determined by the rate of acceleration, the inertia of the mass 15, and the characteristic of the spring 16. In any event, the mass 15 changes its angular position with respect to shaft 12. The relative angular movement between mass 15 and shaft 12 may be regarded as a counter-clockwise rotation of the mass 15 on the shaft 12, as viewed from the left end of the shaft in the drawing. Such a rotation of mass 15 with respect to shaft 12 causes the mass 15 to move to the left along the threaded shaft. The spring 28 acts through the bell-crank lever to maintain the roller 23 in engagement with the right-hand surface of the mass 15. Therefore, the bell-crank lever is rotated slightly clockwise about its pivot, moving the slider 25 upwardly along resistance 26.

A stop 34 on the bracket 21 prevents counter-clockwise rotation of the bell-crank lever from the position shown in the drawing. Therefore, deceleration of the shaft 12 from a condition of constant angular velocity cannot produce motion of slider 25 along resistance 26. The present embodiment of my invention is intended for use in a control system such as that disclosed in the co-pending application of Hubert T. Sparrow, Serial No. 476,797, filed February 22, 1943. In such a control system, as explained in the Sparrow application, a control device is desired which responds only to the accelerations of a rotating shaft, and not to decelerations thereof. It should be readily apparent, however, that my device may be so constructed as to respond to both acceleration and deceleration of the rotating shaft. This may be done by changing the position of the stop 34, for example, so as to permit counter-clockwise rotation of the bell-crank lever from the position shown in the drawing, and by extension of the resistance element 26 in a downward direction, so that it might cooperate with the slider 25 upon such counter-clockwise rotation of the bell-crank lever.

*Figure 2*

There is shown in Figure 2 a control device which includes an acceleration responsive controller, shown in full lines, and a velocity responsive controller, shown in dotted lines. The combined unit including the acceleration responsive controller and the velocity responsive controller is not part of the present invention, but is shown and claimed in the copending application of Hubert T. Sparrow, Serial No. 476,797, filed February 22, 1943, previously referred to. The details of the velocity responsive controller shown in Figure 2 also form no part of the present invention, being shown and claimed in the copending joint application of Hubert T. Sparrow, Daniel G. Taylor, and Glenn H. Witts, Serial No. 486,828, filed May 13, 1943.

Referring to Figure 2, there is shown a housing 301, having an aperture in the central portion of its base, through which aperture passes a shaft 302, the lower end of which is keyed or otherwise adapted for operative connection with an extension of a rotating drive shaft. The casing 301 is provided with a cover 304 having a bearing 305 in its central portion, in which bearing the upper end of the shaft 302 is journaled.

A mass 306, having a hollow, generally cylindrical form is rotatably mounted on the shaft 302 by means of a bearing 307. A cover 308 is attached to the upper surface of the mass 306 by means of screws 310, and is provided with a bearing 311 in which the shaft 302 is journaled. A coil spring 312 has one end suitably attached to a collar 313 carried by the shaft 302, and its other end is received in a suitable aperture in an extension of the cover 308. The mass 306 is thereby flexibly connected to the shaft 302. When the shaft 302 is rotating at a constant speed, the angular position of the mass 306 with respect to the shaft 302 does not change, but upon acceleration of the shaft 302 the mass 306 changes its angular position with respect to the shaft 302 because of its inertia. The spring 312 permits a limited amount of relative movement of the shaft 302 and mass 306, and biases the mass 306 so that it always returns to the same angular position with respect to shaft 302.

The outer periphery of the cover 308 is beveled, and is adapted to engage a similar beveled portion at the lower end of a generally cylindrical cam member 314. The cylindrical cam member 314 is held in place against the cover 308 by means of an outer clamping ring 315 which engages the outer surface of the beveled portion of cam member 314. The ring 315 may be clamped against the cover 308 by means of bolts 316. When so clamped, it holds the cam member 314 against rotation relative to the mass 306. By loosening the bolts 316, the cam member 314 may be adjusted to any desired angular position with respect to the mass 306.

The shaft 302 is slotted, as at 317. The portion of shaft 302 above the slot 317 is hollow. A pin 318 passes through the slot 317, and has its opposite ends fixed in a collar 319, which is slidable along the shaft 302. Because of the pin 318 and slot 317, the collar 319 is not rotatable with respect to shaft 302.

The collar 319 carries a spider comprising a plurality of arms 321, each of which has a bent-up extremity, and in that extremity carries a stub shaft 322, on which rotates a roller follower 323 for cooperation with the cylindrical cam 314. In the structure shown in the drawing, there are three arms 321 on the spider. The cam member 314 is circumferentially divided into three similar cam portions, having a gradual rise from the lowest point thereon to the highest point thereon. At the high point of the cam, the cam surface suddenly rises, terminating in an almost vertical portion which limits the angular movement of the cam with respect to the follower assembly. The follower assembly includes the spider arms 321 and the followers 323. A collar 324 is fixed to the shaft 302 and carries a plurality of outwardly extending arms 325, which are equal in number to the spider arms 321. Each of the arms 325 has a bent-up portion 326, which is received in an aperture in one of the arms 321. The purpose of the arms 325 and their extensions 326 is to guide the follower assembly and to aid in preventing its rotation relative to the shaft 302. Although any convenient number of similar cam portions and cooperating followers may be used, I prefer to use three, as that number permits better balancing of the rotating structure.

Within the hollow portion of the shaft 302 above the pin 318, there moves a thrust rod 327. The thrust rod 327 is tapered at both ends to fit into craters in the pin 318 and in a crosshead 328, whose ends are slidably received in a pair of plates 330 and 331, the latter being broken away in the drawing to illustrate the parts beneath it. The conical ends of the rod 327 are made smaller than the craters into which they fit, and the rod 327 is of smaller diameter than the bore in shaft 302 through which it moves, in order to minimize friction.

A U-shaped bracket 332 is journaled in the plates 330 and 331, at 333. Only one leg of the U-shaped bracket 332 appears in the drawing, but it is believed that its construction will be readily apparent. A pin and slot connection 334 is provided so that the bracket 332 may be angularly adjusted about the pivot 333. The ends of the U-shaped bracket member 332 carry a shaft 335. Pivotally mounted on the shaft 335 is a bracket 336, a portion of which extends into the path of movement of the crosshead 328. The right-hand portion of the bracket 336 terminates in a tongue 337. A tension spring 338 is stretched between the tongue 337 and another tongue 340 associated with the plate 331. The spring 338 biases the bracket 336 for counter-clockwise rotation about the shaft 335, thereby maintaining the bracket 336 in engagement with the crosshead 328.

The pin and slot connection 334 permits adjustment of the normal position of slider 342 relative to resistance 343. By rotating the bracket 332 on its pivot 333, the shaft 335, which is the fulcrum about which the slider 342 pivots, may be moved upwardly or downwardly.

The left end of bracket 336 carries an insulating plate 341, on which is mounted a slider 342. The extremity of slider 342 cooperates with a slidewire resistance 343, which is mounted on the cover 304 of the casing 301. The opposite ends of the slidewire 343 are connected through conductors 344 and 345 to pins in a multiple plug electrical connector carried on an angular extension of plates 330 and 331, and extending through an aperture in the top of a cap 347 which encloses the resistance 343 and its related elements. A pig tail connection 348 connects the slider 342 to another of the pins in the multiple plug electrical connector.

*Operation of acceleration responsive controller*

The shaft 302 rotates in a counter-clockwise direction as viewed from the bottom in Figure 2.

If the device is adapted for use in the control system shown in the copending Sparrow application, previously referred to, then the angular position of cam 314 relative to mass 306 is adjusted, by means of bolts 316 and locking ring 315, so that when the shaft 302 is rotating at a constant velocity, the angular position of the mass 306 relative to the shaft 302 is such that the followers 323 rest in the lower portions of the cam member 314. At that time, the pin 318 is at the bottom of the slot 317, and the pin and slot connection 334 is adjusted so that slider 342 is at or near the lower end of the slidewire resistance 343.

Upon acceleration of the shaft 302, relative movement takes place between the mass 306 and the shaft 302, as previously explained. Since the cam 314 is fixed to the mass 306, and since the followers 323 move angularly with the shaft 302, the relative motion of the mass 306 and shaft 302 causes the followers 323 to be moved up the surfaces on the cam member 314, thereby moving the pin 318, the thrust rod 327, and the slider 342 upwardly.

It will be readily understood that by different adjustments of cam 314 and of pin and slot connection 334, the slider 342 could be made to have normally a central position on resistance 343, and to move upwardly and downwardly along resistance 343 in response to accelerations and decelerations, respectively, of shaft 302.

*Velocity responsive controller*

A plate 350, fixed on the shaft 302 just below the mass 306, is provided with diametrically opposite pairs of downwardly extending ears 351. In each of the pairs of ears 351 is journaled a shaft on which is carried a weight 352. Extensions on the weights 352 engage the upper surface of a housing 354, which is slidable on the shaft 302. A compression spring, not shown in the drawing, biases the housing upwardly to the position shown in the drawing.

The lower portion of the housing 354 bears, through a resilient connection, on a lever 364 which is pivotally mounted at one side of the casing 301, as indicated at 365.

The lever 364 extends from the pivot 365 across the casing 301, spanning the shaft 302 and bearing against the end of a clutch shaft 367, which is biased upwardly into engagement with the lever 364 by means not shown.

A splined portion of the shaft 302 mates with a gear 371 rotatably mounted on the clutch shaft 367. Through a suitable gearing connection, not shown in the drawing, a second gear 372, also rotatably mounted on the clutch shaft 367 is driven in the opposite direction to the gear 371 and at a lower speed. It may be for example, that the gear 372 is driven at one-third the speed of the gear 371. The clutch shaft 367 also carries a double-faced clutch member 373, which is fixed on the said clutch shaft. Near its upper end, the clutch shaft carries a gear 374, which is also fixed on the clutch shaft, and which mates with a gear 375 fixed on a threaded shaft 376. An internally threaded nut 377 rides on the threaded shaft 376, and is moved therealong upon rotation of the shaft 376. The nut 377 carries a slider, not shown on the drawing, which engages the surface of a slidewire resistance 378 mounted in back of the shaft 376.

*Operation of velocity responsive control device*

As long as the angular velocity of the shaft 302 is below a predetermined value, the clutch shaft 367, is biased upwardly, so that clutch 373 engages gear 372. At such a time, the clutch shaft 367 is rotated in a direction so that the threaded shaft 376 rotates to carry the nut 377 downwardly. If the rotative speed of the shaft 302 remains below the predetermined value for a sufficient length of time, the slider carried by the nut 377, moves to the lower end of resistance 378.

If the angular velocity of the shaft 302 increases beyond a predetermined value, the centrifugal force acting on the weights 352 causes them to move outwardly, and the extensions on the weights 352 move the housing 354 downwardly thereby carrying the lever 364 downwardly. This downward movement of lever 364 causes the clutch shaft 367 to be moved downwardly, carrying the clutch 373 into engagement with gear 371. The clutch shaft 367 is thereupon rotated in such a direction that the threaded shaft 378 rotates in a direction to move the nut 377 upwardly, thereby moving the slider carried by nut 377 upwardly along the resistance 378.

It may therefore be seen that as long as the angular velocity of shaft 302 remains below a predetermined value, the slider is maintained at the lower end of resistance 376. When it increases above that value, the slider is moved upwardly along the resistance 376. The position of the slider on the resistance 376 at any time is not determined by the angular velocity of the shaft 302 at that particular instant, but is determined by the length of time during which the angular velocity of the shaft 302 has been above that predetermined value, and by the particular variations in angular velocity of shaft 302 which have taken place since it first exceeded that predetermined value. The position of the slider along the resistance 378 is therefore determined by a time function of the velocity of shaft 302, integrated over the entire interval during which that velocity is greater than a predetermined value.

While I have shown and described certain preferred embodiments of my invention, it will be readily understood that modifications thereof will readily appear to those who are skilled in the art, and I therefore wish to be limited only by the scope of the appended claims.

I claim as my invention:

1. Control apparatus, comprising in combination, a rotatable shaft, a mass rotatably mounted on said shaft, means resiliently connecting said mass and said shaft to permit relative angular movement thereof upon acceleration of said shaft, means for selectively controlling the extent of said relative angular movement, a first stationary control member, a second control member movable with respect to said stationary control member and cooperating therewith to produce a control effect modulatingly varying in accordance with the relative positions of said control members, one of said control members comprising an elongated electrical resistance element and the other of said control members comprising a contact slidable along said resistance, means responsive to relative angular movement of said shaft and mass for causing a proportionate relative movement of said first and second control members, said last-named means including a member movable axially of said shaft, and means for altering the operative relationship between said mass and said shaft to vary the relative positions of said mass and said control member.

2. Control apparatus, comprising in combination, a rotatable shaft, a mass rotatably mounted on said shaft, means resiliently connecting said mass and said shaft to permit relative angular movement thereof upon acceleration of said shaft, means for selectively limiting the extent of said relative angular movement, a first stationary control member, a second control member movable with respect to said stationary control member and cooperating therewith to produce a control effect modulatingly varying in accordance with the relative positions of said control members, and cam and follower means for translating relative angular movements of said mass and said shaft into relative movements of said control members said follower being adapted to cooperate with said movement limiting means.

3. Control apparatus, comprising in combination, a rotatable shaft, a mass rotatably mounted on said shaft, means resiliently connecting said mass and said shaft to permit relative angular movement thereof upon acceleration of said shaft, a stationary elongated electrical resistance element, a contact slidable along said resistance element, means, including cam and follower means, for translating relative angular movements of said mass and said shaft into movements of said contact along said resistance, and abutment means effective to selectively limit the relative angular movements of said mass and said shaft and providing a driving association therebetween for rotation in either direction.

4. Control apparatus, comprising in combination, a rotatable shaft, a mass rotatably mounted on said shaft, means resiliently connecting said mass and said shaft to permit relative angular movement thereof upon acceleration of said shaft, a cam member, an abutment at each end of the operating surface of said cam member, a follower member associated with said cam member, means for selectively positioning said abutments relative to said follower member, means for adjustably supporting one of said members on said mass for determining the normal position of said follower member on said cam, means for mounting the other of said members on said shaft for angular movement therewith and for axial movement along said shaft, said members cooperating to translate relative angular movements of said mass and said shaft into axial movements of said other member, and control means operated by said other member upon an axial movement thereof.

5. Control apparatus, comprising in combination, a rotatable shaft, a substantially cylindrical mass rotatably mounted on said shaft and concentric therewith, means resiliently connecting said mass and said shaft to permit relative angular movement thereof upon acceleration of said shaft, said mass having a substantially conical surface concentric with said shaft, a cylindrical cam member having an annular conical base portion having one surface adapted to interfittingly engage the conical surface on said mass, a locking ring having a conical surface portion adapted to interfittingly engage the other surface of the base portion of said cam, means operable to fix said ring on said mass with said cam member held rigidly between said ring and mass at any selected angular position of said cam member, a follower member associated with said cam member, abutment means on said cam operable to limit relative angular movement of said follower, means for mounting said follower member on said shaft for angular movement therewith and for axial movement along said shaft, said cam and follower members cooperating to translate relative angular movements of said mass and said shaft into axial movements of said follower, said abutment means and said ring fixing means being operable to selectively limit the extent of axial movement of said follower member, and to determine the normal position of said follower, and control means operated by said follower upon axial movement thereof.

6. Control apparatus, comprising in combination, a rotatable shaft, a mass rotatably mounted on said shaft, means resiliently connecting said mass and said shaft to permit relative angular movement thereof upon acceleration of said shaft, a cam member having abutments on each end thereof, a follower member associated with said cam member and adapted to engage said abutments, means for adjustably supporting said cam member on said mass, said supporting means being operable to selectively limit the extent of the relative angular movement of said follower member, a collar slidably and rotatably mounted on said shaft, an arm fixed on said collar, means for supporting said follower member at an extremity of said arm, said arm having an aperture therethrough, guide means fixed on said shaft and extending through said aperture to prevent rotation of said arm with respect to said shaft, said members cooperating to translate relative angular movements of said mass and said shaft into axial movements of said follower member, and control means operated by said follower member upon axial movement thereof.

7. In a control apparatus comprising in combination, a shaft having a hollow end portion, a slot through said shaft at the base of said hollow portion and extending longitudinally thereof, a rod positioned in the hollow end portion of said shaft and projecting therebeyond, a collar positioned on said shaft for angular movement therewith and longitudinal movement relative thereto, said collar being operably associated with said rod, a mass rotatably positioned on said shaft, means resiliently connecting said shaft and said mass and being operable to permit relative angular displacement of the connected members upon a change in the operating speed thereof, a cam member positioned on said mass and rotatable therewith, an abutment member at each end of the working surface of said cam member, a follower member fixed to said collar and in operable engagement with the working surface of said cam member and adapted to engage said abutment members, said resilient connecting means being operable to normally maintain said cam member and said follower member in a given angular position and to yieldably resist relative movement therefrom, and means for selectively altering the normal angular positions of said cam and said follower whereby the position of said rod is proportionately altered, and control means positioned adjacent the end of said shaft and in operable engagement with the projecting end of said rod.

8. In a control apparatus comprising in combination a rotatable shaft, a mass rotatably positioned on said shaft, means resiliently connecting said mass and said shaft and operable to yieldably resist relative angular movement of said shaft and said mass from a normal position, a control operating member operably associated with said shaft and movable longitudinally thereof, a cam member positioned on said mass and rotatable therewith, a follower member rotatable with said shaft and operably associated with said cam member, said follower member being movable longitudinally of said shaft and disposed to impart longitudinal movement to said control operating member, and means for positioning said cam member relative to the normal position of said shaft and said mass to selectively determine the normal position of said follower member and said control operating member.

DANIEL G. TAYLOR.

REFERENCES CITED

The following references are of record in the file of this patent:

UNITED STATES PATENTS

| Number | Name | Date |
|---|---|---|
| 639,470 | Troubetskoy | Dec. 19, 1899 |
| 664,392 | Ellicot | Dec. 25, 1900 |
| 2,390,581 | Gille | Dec. 11, 1945 |
| 441,665 | Hyer | Dec. 2, 1890 |
| 1,214,021 | Eaken | Jan. 30, 1917 |
| 1,669,107 | Umansky | May 8, 1928 |
| 1,855,333 | Borovec, et al. | Apr. 26, 1932 |
| 1,394,111 | Olds | Oct. 18, 1921 |
| 683,688 | Hollingsworth | Oct. 1, 1901 |

FOREIGN PATENTS

| Number | Country | Date |
|---|---|---|
| 298,691 | Great Britain | Oct. 18, 1928 |